(12) United States Patent
Ordas et al.

(10) Patent No.: US 10,361,164 B2
(45) Date of Patent: Jul. 23, 2019

(54) INTEGRATED CIRCUIT PROTECTION METHOD, AND CORRESPONDING INTEGRATED CIRCUIT

(71) Applicant: STMicroelectronics (Rousset) SAS, Rousset (FR)

(72) Inventors: Thomas Ordas, Pourcieux (FR); Alexandre Sarafianos, Trets (FR); Fabrice Marinet, Chateauneuf le Rouge (FR); Stephane Chesnais, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 262 days.

(21) Appl. No.: 15/446,472

(22) Filed: Mar. 1, 2017

(65) Prior Publication Data
US 2018/0005964 A1 Jan. 4, 2018

(30) Foreign Application Priority Data

Jun. 30, 2016 (FR) ..................................... 16 56233

(51) Int. Cl.
| | |
|---|---|
| *H01L 23/00* | (2006.01) |
| *H01L 23/62* | (2006.01) |
| *H01L 27/02* | (2006.01) |
| *H01L 23/522* | (2006.01) |
| *G06F 21/75* | (2013.01) |
| *G06F 21/87* | (2013.01) |
| *G06K 19/073* | (2006.01) |
| *H01L 23/528* | (2006.01) |

(52) U.S. Cl.
CPC ............ *H01L 23/576* (2013.01); *G06F 21/75* (2013.01); *G06F 21/87* (2013.01); *G06K 19/07327* (2013.01); *G06K 19/07363* (2013.01); *H01L 23/528* (2013.01); *H01L 23/62* (2013.01); *H01L 27/0255* (2013.01); *H01L 23/5227* (2013.01)

(58) Field of Classification Search
CPC ................................ H02H 9/04; H02H 9/041
USPC .......................................................... 361/56
See application file for complete search history.

(56) References Cited

U.S. PATENT DOCUMENTS

| | | | |
|---|---|---|---|
| 6,496,119 B1 | 12/2002 | Otterstedt et al. | |
| 2003/0071196 A1* | 4/2003 | Seitz | H01L 27/1443 250/214.1 |
| 2012/0199948 A1 | 8/2012 | Saisse | |

FOREIGN PATENT DOCUMENTS

| | | |
|---|---|---|
| FR | 2971366 A1 | 8/2012 |
| FR | 2985059 A1 | 6/2013 |

* cited by examiner

*Primary Examiner* — Dharti H Patel
(74) *Attorney, Agent, or Firm* — Slater Matsil, LLP

(57) ABSTRACT

An integrated circuit includes a number of components disposed at a surface of a semiconductor body and an interconnect region connecting the components into a functional circuit. A metallic shield is also produced in the interconnect region. A configurable stage is configurable to operate in a receiving antenna configuration or in a detection configuration during which the integrated circuit is configured to detect a presence of an external electromagnetic radiation representative of an attack by injection of faults.

18 Claims, 2 Drawing Sheets

INTEGRATED CIRCUIT PROTECTION METHOD, AND CORRESPONDING INTEGRATED CIRCUIT

CROSS-REFERENCE TO RELATED APPLICATIONS

This application claims priority to French Patent Application No. 1656233, filed on Jun. 30, 2016, which application is hereby incorporated herein by reference.

TECHNICAL FIELD

Embodiments of the invention relate to an integrated circuit protection method and corresponding integrated circuit.

BACKGROUND

Among the types of attacks known to the person skilled in the art, it is possible to cite attack by probing, which entails inserting a probe into the interconnection part of a circuit so as to read the electrical signals emitted by the various components, and then to analyze them so as to obtain information on the operation of the circuit.

In order to protect oneself against this type of attack, it is conventionally possible to place a protection shield in the upper zone of the interconnection part of the circuit. The shield conventionally comprises metallic tracks in which electrical signals are made to flow. Thus, upon inserting the reading probe, the metallic tracks are impaired and the signals can no longer flow in the shield. The circuit can therefore detect an intrusion and, for example, generate an alarm signal so that appropriate action can be taken.

Another known type of attack is attack by injection of faults, which consists in injecting a fault, for example, with an electromagnetic injection coil generating an electromagnetic radiation, in such a way as to modify, for example, the value of one or more bits of a temporary result of a computation without impairing the physical integrity of the circuit.

An analysis of the behavior of the circuit in response to these injections can make it possible to obtain secure information such as, for example, cipher keys.

Ways exist for protecting oneself against this type of attack, such as, for example, cryptographic computations comprising multiple verifications of the computations performed.

However, these schemes can be circumvented by more elaborate fault injection schemes, such as, for example, attacks by double injection of faults.

SUMMARY

Modes of implementation and embodiments of the invention relate to integrated circuits, and in particular embodiments, to the protection of integrated circuits against attacks by injection of faults (DFA, "Differential Fault Analysis" according to the term well known to the person skilled in the art), and most particularly against attacks by injection of faults carried out with the aid of an external electromagnetic radiation.

Thus, according to an embodiment, it is proposed to protect, using hardware and in a simple manner, an integrated circuit against attacks by injection of electromagnetic faults.

According to one aspect, there is proposed a method for protecting an integrated circuit against attacks by injection of faults with the aid of an external electromagnetic radiation, the integrated circuit comprising a metallic shield produced in its interconnection part.

According to a general characteristic of this aspect, the method comprises a detection via the metallic shield of the electromagnetic radiation.

Thus, a shield generally present for protection against probing attacks is advantageously used for the detection of an electromagnetic field liable to generate an injection of faults into the circuit.

According to one mode of implementation, the detection comprises a placing of the shield in a receiving antenna configuration and a detecting of at least one signal greater than a threshold flowing in the shield.

An electromagnetic field liable to generate a fault injection is in practice a field having an intensity greater than a threshold which is manifested by the flow of a signal greater than a threshold in the shield.

And this threshold, which depends on each circuit, is, for example, determinable during a phase of characterization of the integrated circuit with the aid of a test electromagnetic injection coil capable of generating test electromagnetic radiations having adjustable values.

An adjusting of the sensitivity of the detection comprising a connecting of a variable resistor to the metallic shield can be implemented.

Prior to the detection, it is possible to perform a verification of the integrity of the metallic shield which comprises a checking of a possible interruption of the flow of a current in the shield.

According to another aspect, there is proposed an integrated circuit comprising a protection device comprising a metallic shield produced in its interconnection part.

According to a general characteristic of this other aspect, the circuit comprises a detector comprising the metallic shield and are configured to detect a presence of an external electromagnetic radiation representative of an attack by injection of faults.

An electromagnetic field representative of an attack by fault injection corresponds conventionally to an electromagnetic pulse whose amplitude attains or exceeds a predetermined threshold, which can vary from one circuit to another.

The detector can comprise a first command circuit able to place the shield in a receiving antenna configuration, an interface module coupled to the shield and configured to detect a first electrical signal flowing in the antenna and to deliver a first control signal, and a controller configured to receive the first control signal.

According to one embodiment, the integrated circuit comprises a verification circuit configured to verify the integrity of the shield.

The controller can comprise a second command circuit configured to transmit a second electrical signal to an input of the shield and the interface module can be configured to detect the presence of the second electrical signal at the output of the shield and to deliver a second control signal, and the controller is configured to receive the second control signal.

The integrated circuit can also comprise a command stage configurable by the controller and forming in a first configuration the first command circuit and in a second configuration the second command circuit.

According to one embodiment, the metallic shield comprises at least one metallic track comprising a first end and a second end, and the configurable stage comprises a first transistor connected between the first terminal of the metallic track and the ground, a generator configured to generate the second electrical signal, a transmission gate connected between the first terminal and the generator, and the controller configured to command the first transistor and the transmission gate, so that in the first configuration the first transistor is disabled and the transmission gate is in an enabled state, and in the second configuration the first transistor is enabled and the transmission gate is disabled.

According to one embodiment, the interface module comprises a first D flip-flop comprising a first input connected to a supply terminal delivering a supply voltage, a first clock input connected to the second terminal, and a first output, and a second D flip-flop comprising a second input connected to the first output, a second clock input connected to a clock generator delivering a clock signal, and a second output configured to deliver the first or the second control signal respectively on reception of the first or of the second electrical signal on the first input.

The shield can furthermore comprise adjustment circuitry or structure configured to vary the electrical resistance of the shield, and/or protection circuitry or structure connected to the metallic track and configured to protect the integrated circuit against overvoltages.

The shield can comprise a plurality of metallic tracks.

According to another aspect, there is proposed a system comprising an integrated circuit such as described hereinabove, the system being able to be a chip card or a computing system.

BRIEF DESCRIPTION OF THE DRAWINGS

Other advantages and characteristics of the invention will become apparent on examining the detailed description of wholly non-limiting modes of implementation and embodiments and the appended drawings in which.

DETAILED DESCRIPTION OF ILLUSTRATIVE EMBODIMENTS

Figure 1:
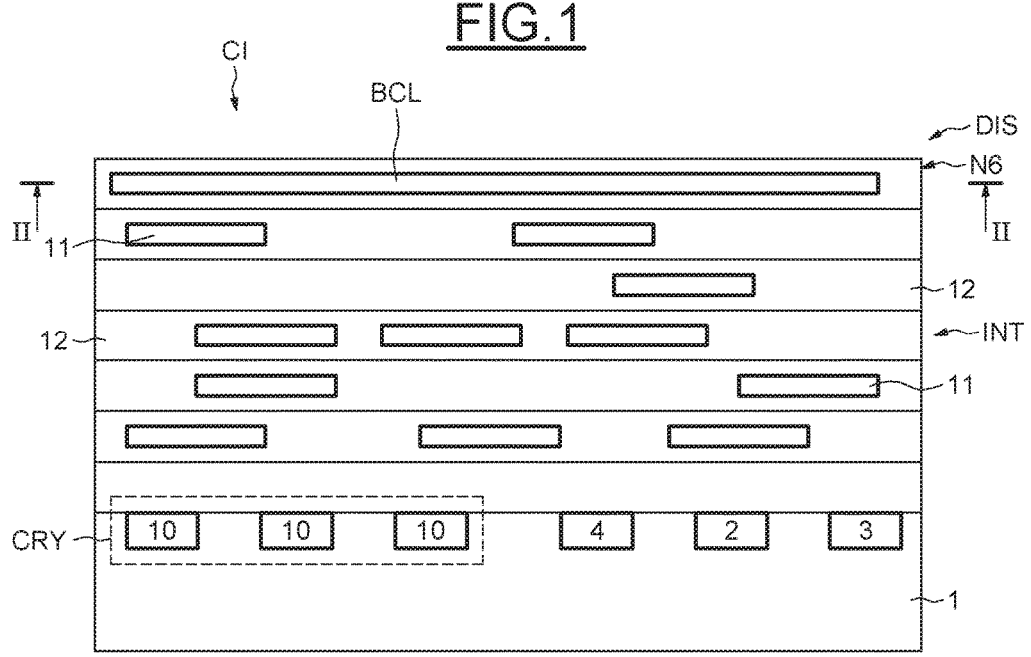
FIGS. 1 to 5 illustrate embodiments of the invention.
Figure 2:
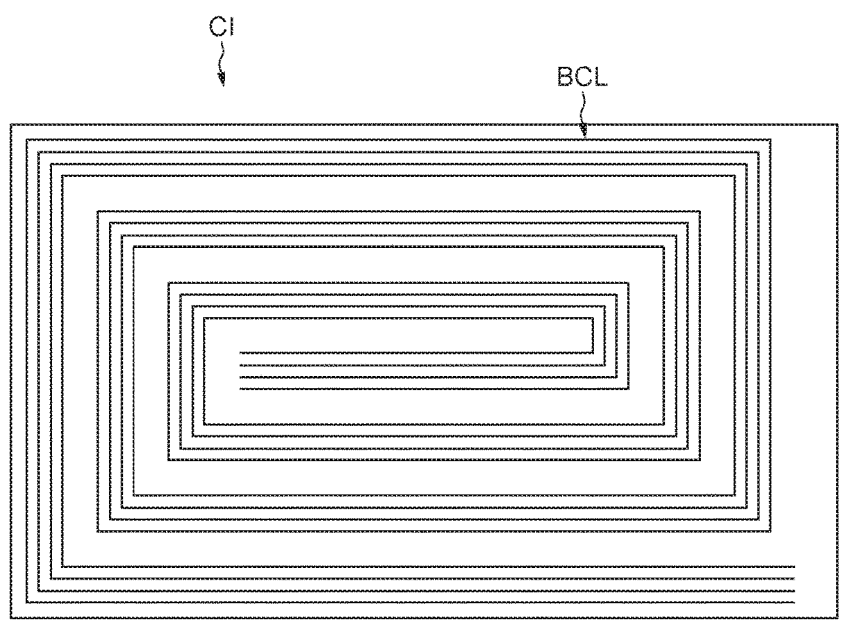

FIG. 1 illustrates an exemplary integrated circuit IC comprising a protection device DEV, and FIG. 2 is a sectional view on the sectional line II-II of FIG. 1.

The integrated circuit IC comprises a semiconducting substrate 1, in which a plurality of components 10 has been produced.

Here the components comprise notably logic gates forming, for example, a cryptographic circuit CRY intended notably to carry out operations in a secure manner.

The substrate 1 is surmounted by an interconnection region INT (known by the person skilled in the art by the acronym BEOL: "Back End Of Line"), comprising several levels of metal each comprising one or more metallic tracks 11 shrouded in an insulating material 12 ("Intermetal dielectric" according to the terminology well known to the person skilled in the art).

Some of the metallic tracks 11 of the metal levels are interconnection tracks linking together certain at least of the components 10 of the cryptographic circuit CRY by way of vias (not represented in the figures for the sake of simplification).

Other metallic tracks can conventionally be tracks for redistributing the supply voltage Vdd of the integrated circuit IC, or linked to the ground GND.

In this example the integrated circuit comprises six metallization levels. Metallization level six N6, which here is the highest level, comprises a shield SHLD which here comprises several parallel metallic tracks disposed so as to form a rectangular spiral. The ends of each metallic track of the spiral are not directly coupled by way of vias to components of the cryptographic circuit CRY, but as will be seen hereinafter to verification circuit 2 and to detector 3 produced in and on the substrate 1.

Here, the shield SHLD, the verification circuit 2 and the detector 3 form part of the protection device DEV.

The verification circuit 2 are configured to generate an electrical signal in each metallic track and to receive this electrical signal so as to verify the physical integrity of the shield. Thus, in case of attack by probing, the metallic tracks are severed by the probe and the verification circuit no longer receives the signal generated. The controller 4 can then generate an alarm signal. The circuit is therefore protected against probing attacks.

The detector 3 is configured to detect the electrical signals induced in the shield by an external electromagnetic field or radiation, and to dispatch if appropriate a signal to the controller 4 of the circuit. In response to this signal, the controller 4 can also generate an alarm signal.

In this example, the controller 4 is produced by a logic circuit produced in the substrate 1 of the integrated circuit IC. That said, it would be conceivable to implement the controller 4 using software, for example, within a microcontroller.

Thus, in this case the shield SHLD is used as a receiving antenna, and is able to detect a particularly intense electromagnetic field generated by an electromagnetic injection coil used, for example, during an attack by electromagnetic fault injection.

Here the integrated circuit IC therefore comprises two protection systems protecting it against two different types of attacks, using a common structure, namely the shield SHLD. This is notably advantageous in terms of method of fabrication and production cost.

Figure 3:
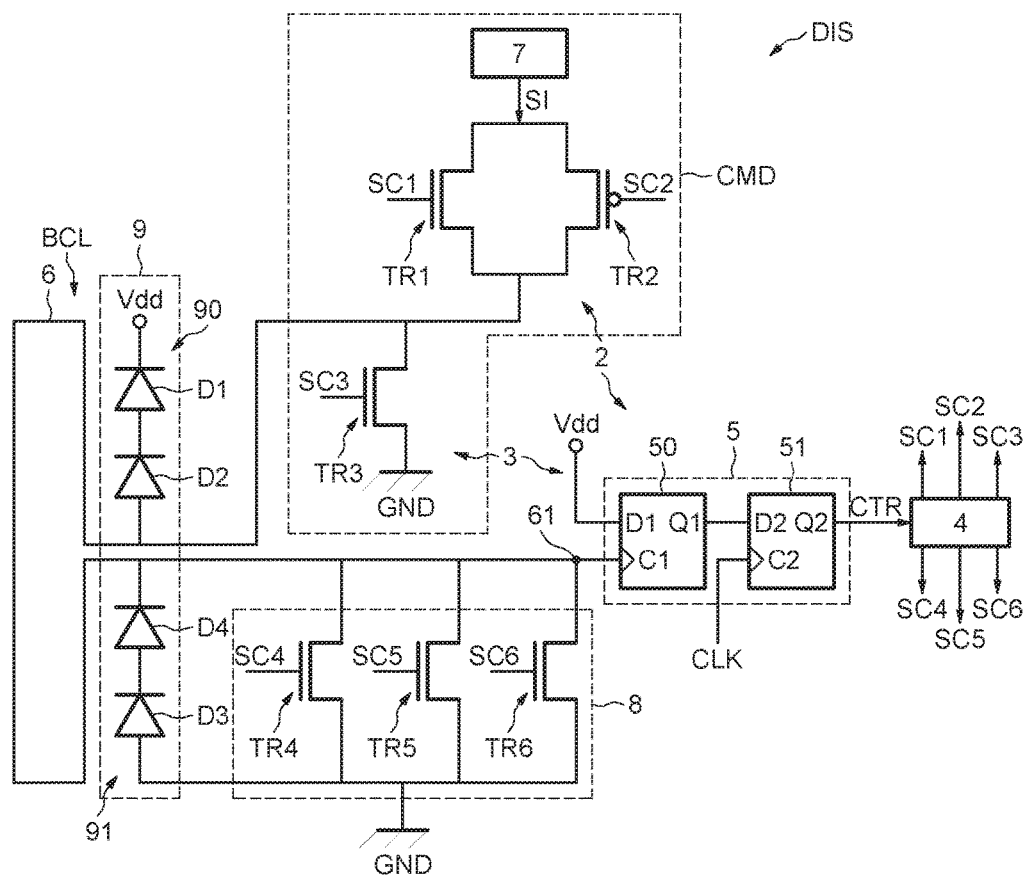

FIG. 3 is a schematic representation from the electrical point of view of a protection device DEV according to an embodiment of the invention, which comprises the verification circuit 2 and the detector 3.

In this embodiment, the shield SHLD comprises a single metallic track 6.

The detector 3 comprises the shield SHLD, an interface module 5, the controller 4, and a configurable command stage CMD configured in a first configuration to form first the command circuit.

The verification circuit 2 comprises the shield SHLD, the interface module 5, the controller 4, and the configurable stage CMD configured in a second configuration to form the second command circuit.

The controller 4 is configured to place the configurable stage CMD in its first configuration or in its second configuration on the basis of logical command signals $SC_1$, $SC_2$, and $SC_3$.

The configurable stage CMD here comprises a transmission gate 20 (or "Path gate" according to the term well known to the person skilled in the art) electrically connected to a first end of the shield SHLD, or first terminal 60.

The transmission gate 20 conventionally comprises an nMOS transistor $TR_1$ and a pMOS transistor $TR_2$, having their sources connected together electrically and their drains connected together electrically.

The transmission gate 20 exhibits the advantage of being particularly reliable, but any other type of breaker might have been envisaged here.

The drains of the transistors $TR_1$ and $TR_2$ are coupled to the first terminal 60, and the sources of the transistors $TR_1$ and $TR_2$ are coupled to signal generator 7, for example, here a current source.

Here, the controller 4 is coupled to the gates of the transistors $TR_1$ and $TR_2$ and therefore control the transmission gate 20 by way of the signals $SC_1$ and $SC_2$, the signal $SC_2$ being the complementary signal of the signal $SC_1$.

Thus, in order to enable the transmission gate 20, and therefore to transmit a first signal $S_1$ generated by the signal generator 7 to the metallic track 6, the signal $SC_1$, here a non-zero potential, is applied by the controller 4 to the gate of the nMOS transistor $TR_1$ and the signal $SC_2$, here a zero potential, is applied by the controller 4 to the gate of the pMOS transistor $TR_2$.

The configurable stage CMD furthermore comprises a third transistor TR3 coupled between the first terminal 60 and the ground GND, and controlled by the signal $SC_3$ of the controller 4.

The interface module 5 comprises a first "D" flip-flop 50 conventionally comprising a first data input $D_1$, a first clock input $C_1$, and a first output $Q_1$, and a second "D" flip-flop 51 comprising a second data input $D_2$, a second clock input $C_2$ and a second output $Q_2$.

For each occurrence of an edge on their respective clock input $C_1$ and $C_2$, the flip-flops 50 and 51 copy their respective data input $D_1$ and $D_2$ over to their respective output $Q_1$ and $Q_2$.

The first clock input $D_1$ of the first flip-flop 50 is coupled to the second terminal 61 of the metallic track 6, and the first data input $D_1$ is coupled to a supply terminal of the integrated circuit IC, which delivers the signal Vdd.

The second data input $D_2$ is coupled to the first output $Q_1$ of the first flip-flop 50 and the second clock input $C_2$ is coupled to a clock signal generator (not represented) delivering a signal CLK, for example, the clock signal generator used to pace the secure operations of the cryptographic circuit CRY. The second output $Q_2$ of the second flip-flop 51 is coupled to the controller 4 of the integrated circuit IC.

Thus, upon the occurrence of a signal on the first clock input $C_1$, the signal Vdd is copied over to the first output $Q_1$ and transmitted to the second input $D_2$. On each edge of the clock signal CLK, the signal Vdd is therefore also copied over to the second output $Q_2$ and transmitted to the controller 4.

The signal Vdd output by the interface module 5 can therefore be considered to be a control signal CTR.

Thus, by virtue of the second flip-flop 51, the interface module 5 will advantageously deliver the control signal CTR in a synchronous manner, that is to say on the occurrence of a clock edge.

As was seen hereinabove, the device DEV possesses a configurable command stage CMD comprising the third transistor $TR_3$ and the transmission gate 20, and the configurable stage CMD can be configured in its first configuration or in its second configuration by virtue of the control signals $SC_1$, $SC_2$ and $SC_3$.

In the first configuration, the third transistor $TR_3$ is disabled by applying the signal $SC_3$ to its gate, for example, here a zero potential. This configuration makes it possible to verify the physical integrity of the shield SHLD.

To this end, a first signal $S_1$ is transmitted to the first terminal 60 by the signal generator 7 and the transmission gate 20. For example, the signal $S_1$ can be a current pulse, of Dirac type, generated by a very short passage of the transmission gate 20 to the enabled state.

If the metallic track 6 is severed, that is to say, for example, if an attack by probing has taken place, the first signal $S_1$ is not transmitted to the interface module 5 which therefore does not transmit the voltage Vdd, or control signal CTR, to the controller 4. In this first configuration, the controller 4 is configured to generate an alarm signal in the absence of the control signal CTR.

If the metallic track 6 is not severed, that is to say if no attack by probing has taken place, the first signal $S_1$ is indeed transmitted to the interface module 5 which dispatches the control signal CTR to the controller 4, which therefore do not generate any alarm signal.

In the second configuration, the transmission gate 20 is disabled and the third transistor $TR_3$ is enabled. The first terminal 60 of the metallic track 6 is therefore connected to the ground GND.

Thus, in this second configuration, the metallic track 6 behaves as a receiving antenna. In case of attack by electromagnetic fault injection, that is to say in the presence of a particularly intense electromagnetic field across the shield SHLD, a current is generated in the metallic track 6 and transmitted to the interface module 5. The interface module 5 then dispatches the control signal CTR to the controller 4, which in this second configuration generate an alarm signal.

Conventionally on booting up the integrated circuit IC, the device DEV is in the first configuration, and passes to the second configuration once verification has been performed.

The device DEV furthermore comprises an adjustment circuit 8 making it possible to adjust the sensitivity of the detector 3.

The adjustment circuit 8 here comprises a plurality of transistors $TR_4$, $TR_5$, and $TR_6$ coupled in parallel between the ground GND and the second terminal 61.

The transistors are commanded by the controller 4 via signals $SC_4$, $SC_5$ and $SC_6$. As a function of the desired sensitivity, the controller 4 places one or more transistors in the enabled state. The adjustment circuit 8 therefore acts here as a variable resistor.

Thus, by adjusting the resistance value, the potential on the second terminal 61 resulting from the presence of an electromagnetic field of given intensity also varies.

In other words, the interface module 5 being triggered only onwards of a certain value of potential on the first clock input $C_1$, and therefore on the second terminal 61, the adjustment circuits 8 makes it possible to define a detection threshold for the device DEV.

The value of the detection threshold is obtained during a phase of characterization of the device DEV, by intentionally carrying out attacks by injection of faults with the aid of an electromagnetic injection coil emitting electromagnetic pulses of different amplitudes, and by determining a threshold amplitude onwards of which the pulse allows fault injection.

The resistance of the shield SHLD is thereafter adjusted in such a way that fields of lower amplitude than the threshold amplitude do not trigger the interface module.

The detection threshold is therefore specific to each circuit.

This is particularly advantageous when the integrated circuit IC is used in an environment comprising electromagnetic disturbances, for example, in proximity to other electronic apparatuses, so that the detector 3 is not triggered by the disturbances but solely by an electromagnetic attack.

The device DEV furthermore comprises an overvoltage protection circuit 9 configured to protect the device DEV against overvoltages.

Indeed, during an attack by fault injection, the intensity of the electromagnetic field generated by the injection coil is not foreseeable, and it is possible that overly significant currents are generated in the device DEV, and this may damage the circuit.

The protection circuit 9 comprises two pairs of diodes 90 and 91.

The first pair of diodes 90 comprises a first diode $D_1$ and a second diode $D_2$ mounted in series, the anode of the first diode $D_1$ being connected to the first terminal 60 and the cathode of the second diode $D_2$ being connected to the supply terminal of the integrated circuit delivering the signal Vdd.

The second pair of diodes 91 comprises a third diode $D_3$ and a fourth diode $D_4$ mounted in series, the anode of the third diode $D_3$ being connected to the ground GND and the cathode of the fourth diode $D_4$ being connected to the second terminal 61.

The integrated electronic circuit IC described above and illustrated in FIGS. 1 to 3 can conventionally be integrated into a system comprising a processing unit, conventionally in a processing unit of a chip card, of a computer, or of a mobile telephone set, which require the implementation of secure operations.

Figure 4:
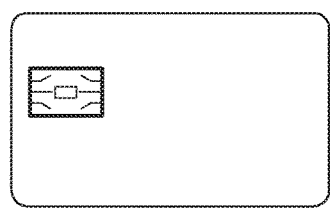
Figure 5:
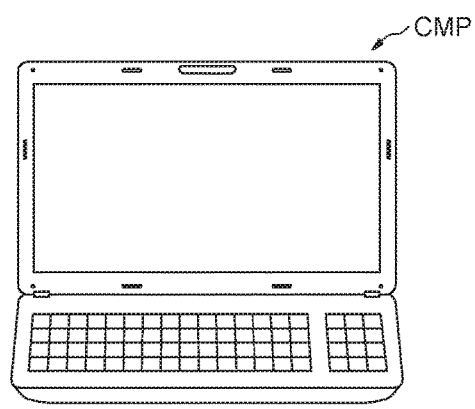

FIGS. 4 and 5 illustrate computing systems comprising secure processing units in which are produced integrated circuits IC according to an embodiment of the invention. FIG. 4 illustrates a chip card CC and FIG. 5 illustrates a laptop computer CMP. The chip card CC and the laptop computer CMP comprise, for example, a microprocessor comprising an integrated circuit according to an embodiment of the invention.

The examples of application of the invention are not limited to those illustrated in FIGS. 4 and 5, and the person skilled in the art will be able to apply the modes of implementation and embodiments of the invention described above and illustrated in FIGS. 1 to 3 to other known systems.

The modes of implementation and embodiments presented here are wholly non-limiting. Notably, although an integrated circuit comprising a single device was described above, it would be entirely possible to envisage an integrated circuit comprising several secure modules produced in the substrate, each of these modules being associated with a separate protection device with the shield produced above the module.

Also, although the electrical diagram of a device DEV comprising a single metallic track 6 was described, it should be noted that in the case of a device comprising a plurality of metallic tracks, each of these tracks would be used in the first configuration as the verification circuit, while in the second configuration one of them or several of them would be used as receiving antenna.

What is claimed is:

1. A method comprising:
experiencing, at an integrated circuit, an attack by injection of faults via an external electromagnetic radiation, the integrated circuit comprising a metallic shield disposed in an interconnection region of the integrated circuit; and
using the metallic shield to detect the external electromagnetic radiation by locating the metallic shield in a receiving antenna configuration and comparing a signal generated by the metallic shield against a threshold.

2. The method according to claim 1, further comprising adjusting a sensitivity of detection by connecting a variable resistor to the metallic shield.

3. The method according to claim 1, wherein prior to using the metallic shield to detect the external electromagnetic radiation, the method further comprises verifying an integrity of the metallic shield by checking a possible interruption of current flow in the metallic shield.

4. An integrated circuit comprising:
a plurality of components disposed at a surface of a semiconductor body;
an interconnect region connecting the components into a functional circuit;
a protection device comprising a detector produced in the interconnect region, wherein the detector comprises a metallic shield and is configured to detect a presence of an external electromagnetic radiation representative of an attack by injection of faults; and
a verification circuit configured to verify an integrity of the metallic shield.

5. The integrated circuit according to claim 4, wherein the detector comprises:
a first command circuit able to place the metallic shield in a receiving antenna configuration;
an interface module coupled to the metallic shield and configured to detect a first electrical signal flowing in the receiving antenna and to deliver a first control signal; and
a controller configured to receive the first control signal.

6. The integrated circuit according to claim 5, further comprising a verification circuit configured to verify the integrity of the metallic shield, wherein the verification circuit comprises a second command circuit configured to transmit a second electrical signal to an input of the metallic shield, the interface module configured to detect the presence of the second electrical signal at an output of the metallic shield and to deliver a second control signal, wherein the controller is configured to receive the second control signal.

7. The integrated circuit according to claim 6, comprising a configurable stage that is configurable by the controller, the configurable stage forming the first command circuit in a first configuration and the second command circuit in a second configuration.

8. The integrated circuit according to claim 7, wherein the metallic shield comprises a metallic track comprising a first terminal and a second terminal;
wherein the configurable stage comprises a transistor connected between the first terminal of the metallic track and a ground terminal, a signal generator configured to generate the second electrical signal, a transmission gate connected between the first terminal and the signal generator; and
wherein the controller is configured to command the transistor and the transmission gate, so that in the first configuration the transistor is disabled and the transmission gate is in an enabled state, and in the second configuration the transistor is enabled and the transmission gate is disabled.

9. The integrated circuit according to claim 8, wherein the interface module comprises:
a first D flip-flop comprising a first input connected to a supply voltage terminal, a first clock input connected to the second terminal, and a first output; and
a second D flip-flop comprising a second input connected to the first output, a second clock input connected to a clock generator, and a second output configured to deliver the first control signal on reception of the first electrical signal on the first clock input or the second control signal on reception of the second electrical signal on the first clock input.

10. The integrated circuit according to claim 4, wherein the metallic shield further comprises an adjustment circuit configured to vary an electrical resistance of the metallic shield.

11. The integrated circuit according to claim 4, further comprising an overvoltage protection circuit at the metallic shield and configured to protect the functional circuit against overvoltages.

12. The integrated circuit according to claim 4, wherein the metallic shield comprises a plurality of metallic tracks.

13. The integrated circuit according to claim 4, wherein the integrated circuit is part of a chip card.

14. The integrated circuit according to claim 4, wherein the integrated circuit is part of a computing system.

15. An integrated circuit comprising:
   a plurality of components disposed at a surface of a semiconductor body;
   an interconnect region connecting the components into a functional circuit;
   a metallic shield produced in the interconnect region; and
   a configurable stage that is configurable to operate in a receiving antenna configuration or in a detection configuration during which the integrated circuit is configured to detect a presence of an external electromagnetic radiation representative of an attack by injection of faults.

16. The integrated circuit according to claim 15, further comprising:
   an interface module coupled to the metallic shield and configured to detect a first electrical signal flowing in the receiving antenna and to deliver a first control signal; and
   a controller configured to receive the first control signal.

17. The integrated circuit according to claim 16, wherein the interface module comprises:
   a first D flip-flop comprising a first input connected to a supply voltage terminal, a first clock input connected to a second terminal of the metallic shield, and a first output; and
   a second D flip-flop comprising a second input connected to the first output, a second clock input connected to a clock generator, and a second output configured to deliver the first control signal on reception of the first electrical signal on the first clock input or a second control signal on reception of a second electrical signal on the first clock input.

18. The integrated circuit according to claim 15, wherein the metallic shield comprises a metallic track comprising a first terminal and a second terminal;
   wherein the configurable stage comprises a transistor connected between the first terminal of the metallic track and a ground terminal, a signal generator configured to generate an electrical signal, and a transmission gate connected between the first terminal and the signal generator; and
   wherein the integrated circuit further comprises a controller configured to command the transistor and the transmission gate, so that in the receiving antenna configuration the transistor is disabled and the transmission gate is in an enabled state, and in the detection configuration the transistor is enabled and the transmission gate is disabled.

* * * * *